United States Patent
Gotoh (10) Patent No.: US 6,666,103 B2
(45) Date of Patent: Dec. 23, 2003

(54) TORQUE TRANSMISSION DEVICE

(75) Inventor: Yuuji Gotoh, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 30 days.

(21) Appl. No.: 09/897,806

(22) Filed: Jul. 5, 2001

(65) Prior Publication Data

US 2002/0033061 A1 Mar. 21, 2002

(30) Foreign Application Priority Data

Aug. 1, 2000 (JP) .......................... 2000-233017

(51) Int. Cl.[7] .................. F16H 1/06; F16H 1/20
(52) U.S. Cl. .................... 74/412 R; 74/413; 74/414
(58) Field of Search .................. 74/412 R, 413, 74/414; 384/590, 593, 618, 619; F16H 1/08

(56) References Cited

U.S. PATENT DOCUMENTS

| | | | | |
|---|---|---|---|---|
| 1,551,565 A | * | 9/1925 | Hodgkinson | 101/181 |
| 3,513,715 A | * | 5/1970 | Whitfield | 101/181 |
| 4,361,058 A | * | 11/1982 | Witt | 475/346 |
| 4,422,531 A | * | 12/1983 | Ohtomi et al. | 74/410 |
| 5,131,498 A | | 7/1992 | Kato | |
| 5,339,707 A | * | 8/1994 | Arbus | 242/562.1 |
| 5,366,422 A | * | 11/1994 | Dye et al. | 475/249 |
| 6,302,819 B1 | * | 10/2001 | Yamada et al. | 475/214 |
| 6,306,059 B1 | * | 10/2001 | Yamada | 475/214 |

FOREIGN PATENT DOCUMENTS

| | | |
|---|---|---|
| EP | 0 333 487 | 9/1989 |
| EP | 0 825 359 | 2/1998 |
| JP | 10-267107 | 10/1998 |
| JP | 11-82653 | 3/1999 |

* cited by examiner

*Primary Examiner*—David A. Bucci
*Assistant Examiner*—Justin Stefanon
(74) *Attorney, Agent, or Firm*—Foley & Lardner (57) ABSTRACT

A first helical gear (40) is supported by a first rotation shaft (4), and a second helical gear (13) is supported by a second rotation shaft (14). A rotation body (6, 7) comprising a third helical gear (7) which meshes with the first helical gear (40), and a fourth helical gear (6) which meshes with the second helical gear (13), is supported by an intermediate shaft (5). The rotation body (6, 7) is further supported by a thrust bearing (10, 11) in a direction along the intermediate shaft (5). The average radius R of the thrust bearing (10, 11) is determined according to the direction of the thrust load acting on the third helical gear (7), the direction of the thrust load acting on the fourth helical gear (6), and an angle θ2 subtended by the application point of these thrust loads.

10 Claims, 10 Drawing Sheets

TILTING MOMENT < MOMENT DUE TO REACTION

FIG. 4B

TILTING MOMENT > MOMENT DUE TO REACTION

FIG. 12

TORQUE TRANSMISSION DEVICE

FIELD OF THE INVENTION

This invention relates to a structure for supporting an intermediate shaft for transmitting torque of a prime mover to a drive shaft of a vehicle.

BACKGROUND OF THE INVENTION

Tokkai Hei 11-82653 published by the Japanese Patent Office in 1999 discloses a torque transmission device for a vehicle wherein an intermediate shaft is disposed between an output shaft of a transmission and a drive shaft of a differential, and power is transmitted between the transmission and drive shaft via an idler gear and reduction gear fixed to the intermediate shaft.

The idler gear meshes with an output gear fixed to the output shaft of the transmission, and the reduction gear meshes with a final drive gear fixed to the drive shaft. These gears are all helical gears.

Due to the meshing of these helical gears, a thrust load is mutually exerted according to the tooth trace direction. This thrust load acts by means of a gripping part of the helical gears which is offset from the rotation axis of the helical gears. Therefore, a moment acts on the intermediate shaft according to the offset distance of the application point of the thrust load. To support this moment exerted by the idler gear and reduction gear on the intermediate shaft, the intermediate shaft is supported by a tapered roller bearing which can support the thrust load and a radial load. Further, in the design stage of the torque transmission device, the moment which acts on the intermediate shaft in operation is estimated, and a prestress which opposes the estimated moment is applied to the taper roller bearing when it is fitted to the torque transmission device. This prestress cancels the moment acting on the intermediate shaft during torque transmission, and helps to reduce the noise due to the meshing of the gears.

SUMMARY OF THE INVENTION

The prestressed tapered roller bearing however increases the frictional loss of the intermediate shaft.

Further, the prestressed bearing brings another problem. The prestress is generally given by gripping a shim or spring between the outer race of the tapered roller bearing and a casing of the torque transmission device. When a shim is used, its dimensions have to be precisely controlled in order to generate a designed prestress. When a spring is used control of the prestress is easier, but an exclusive space is required to install the spring. As a result, the prestressed bearing makes the assembly of the torque transmission device complex, and leads to increase in the size of the casing.

It is therefore an object of this invention to suppress noise produced due to meshing of helical gears without applying a prestress to the bearing.

In order to achieve the above object, this invention provides a torque transmission device, comprising a first rotating shaft supporting a first helical gear, a second rotating shaft supporting a second helical gear, a rotation body comprising a third helical gear which meshes with the first helical gear and a fourth helical gear which meshes with the second helical gear, an intermediate shaft which supports the rotation body, and a thrust bearing which supports the rotation body in a direction along the intermediate shaft. The second rotating shaft and the intermediate shaft are disposed parallel to the first rotating shaft. The thrust bearing is set to have an average radius R specified by the following equation:

$$R \geq \frac{R1 \cdot R2}{(R1 + R2 \cdot H)\sqrt{2 \cdot H\left\{\frac{(1+H^2)}{2} \cdot H + \cos\theta 2\right\}}} \text{ where,}$$

$$H = \frac{\tan\beta 1}{\tan\beta 2},$$

R1=pitch circle radius of the third helical gear,
R2=pitch circle radius of the fourth helical gear,
β1=spiral angle of the third helical gear,
β2=spiral angle of the fourth helical gear, and
θ2=angle subtended by the mesh point of the first helical gear and third helical gear, and the mesh point of the second helical gear and fourth helical gear, with the intermediate shaft as center.

The details as well as other features and advantages of this invention are set forth in the remainder of the specification and are shown in the accompanying drawings.

DESCRIPTION OF THE PREFERRED EMBODIMENTS

Figure 1:
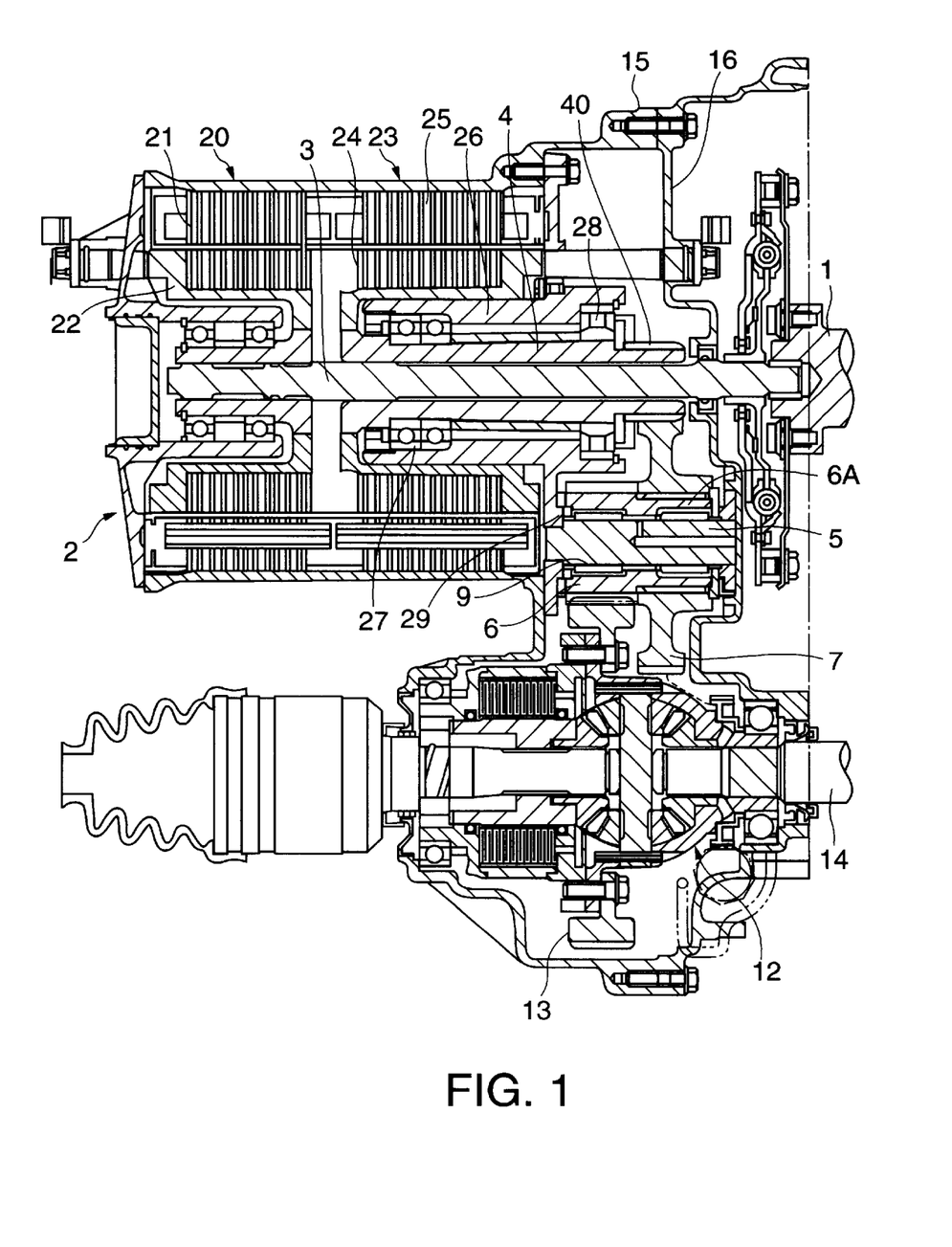
FIG. 1 is a schematic cross-sectional view of a vehicle drive train mechanism including a torque transmission device according to this invention.

Referring to FIG. 1 of the drawings, a vehicle drive train comprises an electrical transmission 2, a differential 12 and a torque transmission device interposed therebetween.

The electrical transmission 2 is provided with two motor/generators 20, 23.

The motor/generator 20 comprises a rotor 20 and stator 21. The rotor 20 is joined to the crankshaft of an engine, not shown, via an input shaft 3.

The motor/generator 23 comprises a rotor 24 and stator 25. The rotor 24 is joined to a sleeve-shaped output shaft 4 disposed coaxially on the outside of the transmission input shaft 3. The stators 21, 25 are fixed to a casing 15.

In the transmission 2, electric power is generated by the motor/generator 20 due to rotation of the input shaft 3 driven by the engine, and the generated power drives the motor/generator 23 so as to rotate the output shaft 4. The speed ratio is controlled via an inverter, not shown.

The output shaft 4 is supported in the casing 15 via bearings 27, 28, and a bearing holder 26. An output gear 40 is formed on the outer circumference of one end of the output shaft 4 on the right-hand side of FIG. 1. The output gear 40 meshes with an idler gear 7 which rotates around an idler shaft 5.

The idler shaft 5 is disposed parallel to the input shaft 3 and output shaft 4.

Figure 2:
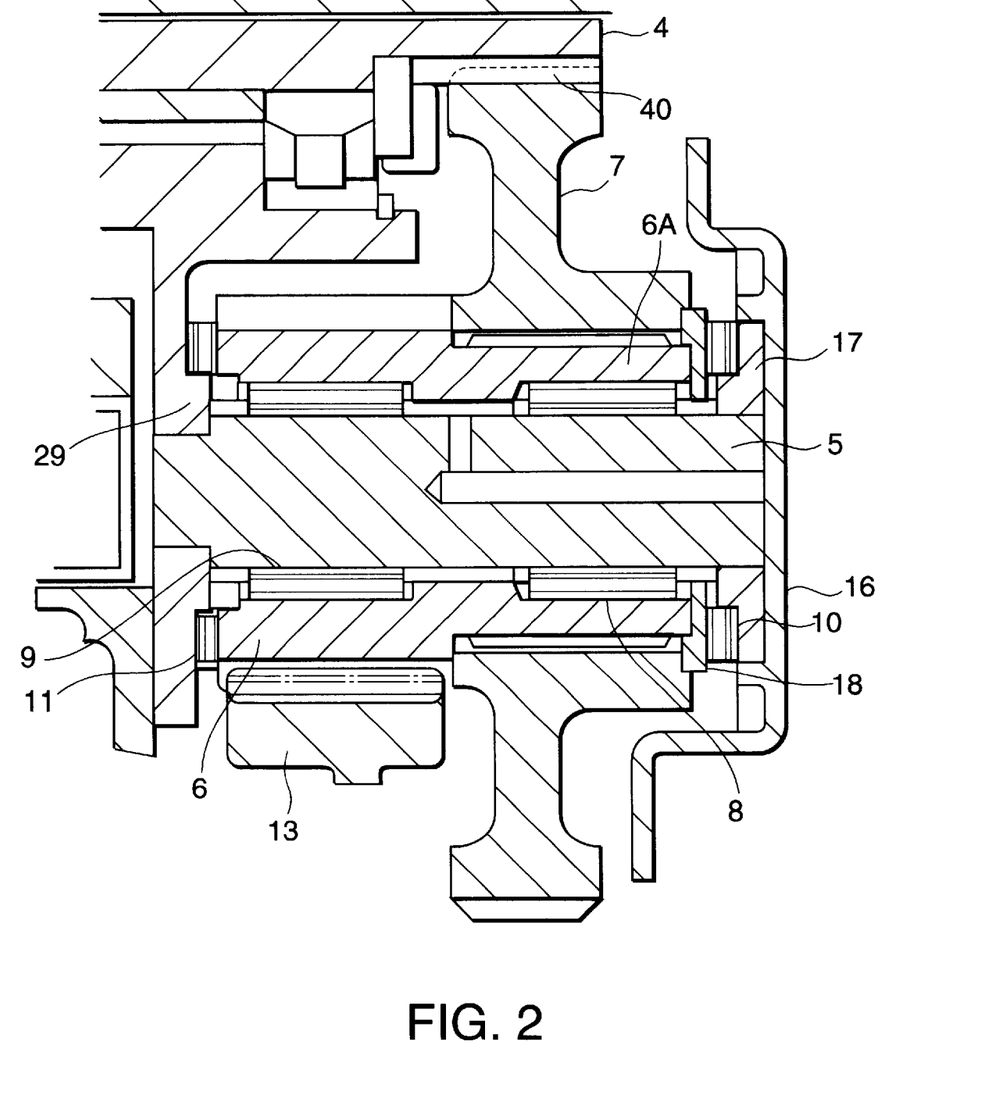
FIG. 2 is an enlarged longitudinal sectional view of the torque transmission device.

Referring to FIG. 2, one end of the idler shaft 5 is fixed to a bracket 29 formed in one piece with the bearing holder 26. The other end of the idler shaft 5 is fixed to a cover 16 of the casing 15 via a fixing member 17.

A reduction gear 6 is arranged on the idler shaft 5 so as to rotate together with the idler gear 7. The reduction gear 6 comprises a sleeve-shaped extension part 6A, and the inner circumference of the idler gear 7 is spline-jointed to the outer circumference of the extension part 6A. The reduction gear 6 is supported on the outer circumference of the idler shaft 5 by radial bearings 8, 9, each comprising a needle bearing. A retainer 18 is fixed to one end of the extension part 6A. The retainer 18 is supported on the cover 16 via a thrust bearing 10 comprising a needle bearing and a fixing member 17 fixed to the cover 16. The opposite end of the reduction gear 6 is supported on a bracket 29 by a thrust bearing 11 comprising a needle bearing.

The reduction gear 6 meshes with a final drive gear 13 of the differential 12. The rotation of the final drive gear 13 is output to left and right drive shafts 14 via the differential 12.

The transmission output shaft 4 corresponds to a first rotation shaft, the drive shafts 14 correspond to a second rotation shaft and the idler shaft 5 corresponds to a third rotation shaft. The output gear 40 corresponds to a first helical gear, the final drive gear 13 corresponds to a second helical gear, the idler gear 7 corresponds to a third helical gear and the reduction gear 6 corresponds to a fourth helical gear.

Next, referring to FIG. 3, the tooth trace direction of the output gear 40, idler gear 7, reduction gear 6 and the final drive gear 13, all of which are helical gears, is set as follows.

Specifically, the tooth trace of the output gear 40 is a right-hand helix while the tooth trace of the idler gear 7 is a left-hand helix. The tooth trace of the reduction gear 6 is a right-hand helix while the tooth trace of the final drive gear 13 is a left-hand helix. As a result, when torque is transmitted from the output shaft 4 to the drive shafts 14, a thrust force Ka2 acts on the reduction gear 6 on the idler shaft 5 and a thrust force Ka1 acts on the idler gear 7, both these forces acting toward the cover 16.

Figure 4A:
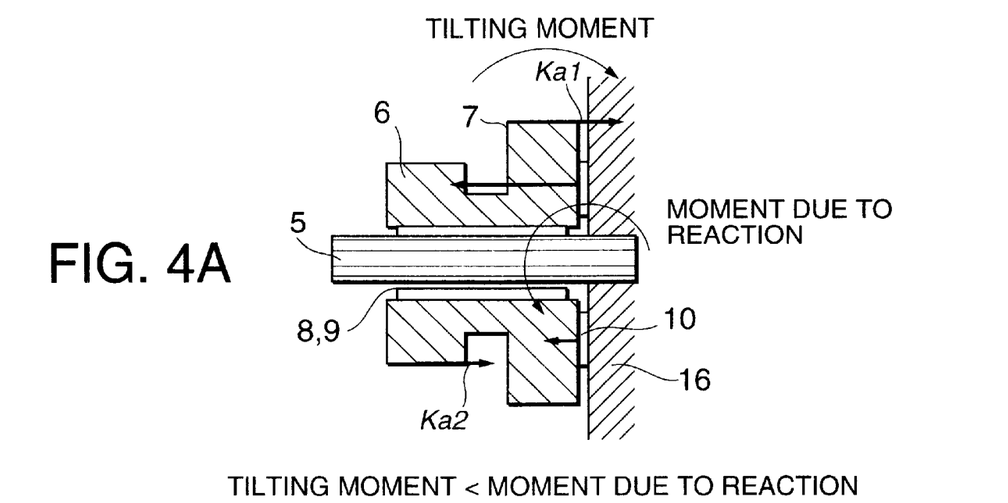
FIGS. 4A and 4B are a schematic longitudinal sectional view of the torque transmission device describing loads acting on the device.

Next, referring to FIG. 4A, a moment tending to incline the idler shaft 5 acts according to the magnitude of the thrust force Ka1 acting on the idler gear 7 and the magnitude of the thrust force Ka2 acting on the reduction gear 6. The thrust bearing 10 prevents tilt of the idler shaft 5 by generating a reaction force opposing this moment.

The thrust forces Ka1, Ka2 may be extremely different depending on the relation between the meshing position of the idler gear 7 and output gear 40 and the meshing position of the reduction gear 6 and final drive gear 13, the spiral angle of the helical teeth of the idler gear 7 and reduction gear 6, or the difference in pitch diameters thereof.

Figure 4B:
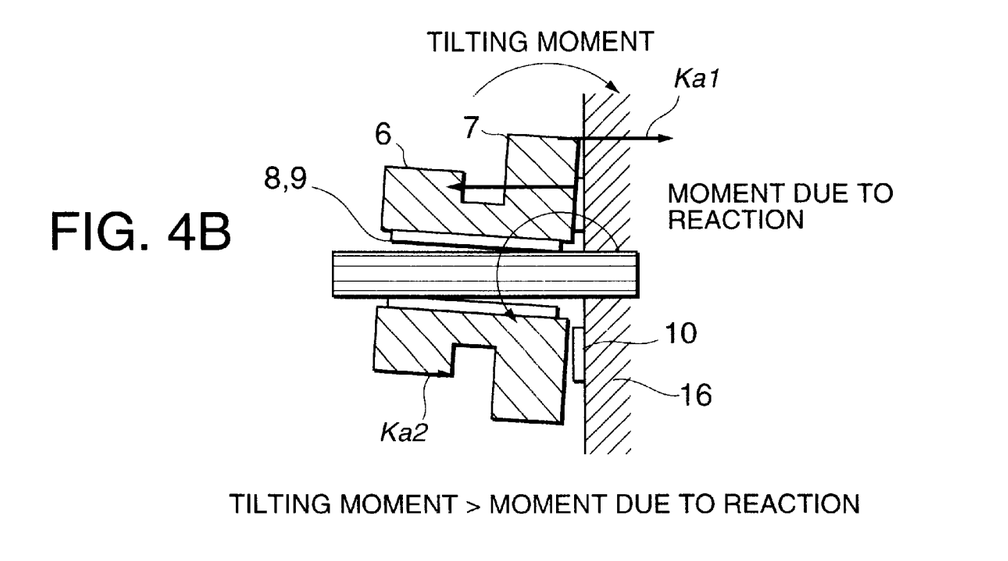

Referring to FIG. 4B, when for example the thrust force Ka1 is much larger than the thrust force Ka2, and the application point of the thrust force Ka1 is situated further outside than the application point of the reaction of the thrust bearing 10, it is impossible to stop the tilt of the idler shaft 5 only by the thrust bearing 10.

FIGS. 4A and 4B show models describing the relation between the helical gear meshing position and the application point of the reaction exerted by the thrust bearing 10. In these figures, to simplify the description, the idler shaft 5 is supported as a cantilever and the idler gear 7 and reduction gear 6 are formed in one piece.

In this torque transmission device, tilt of the idler shaft 5 is prevented by specifying the relation between the helical gear meshing position and the application point of the reaction exerted by the thrust bearing 10 in the following way.

For the purpose of this specification, loads and positional relations are defined as follows.

Figure 5:
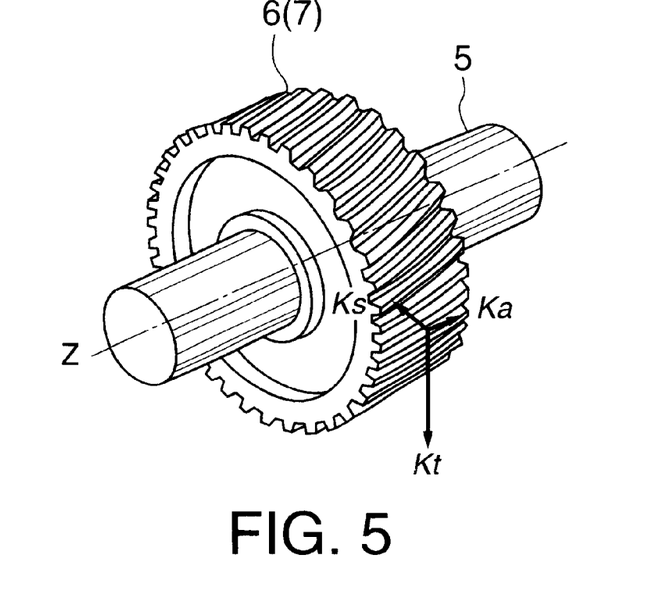
FIG. 5 is a perspective view of one of two helical gears with which the torque transmission device is provided, describing a force acting on a tooth surface of the gear.
Figure 6:
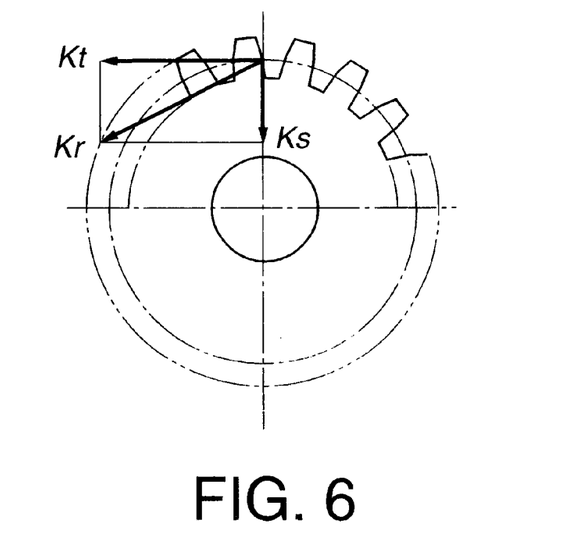
FIG. 6 is a side view of the gear describing the force acting on the tooth surface of the gear.

As shown in FIGS. 5 and 6, the force acting on the helical gear 6 or 7 may be split into a tangential load Kt along a tangent to the pitch circle, a central load Ks, and an axial load Ka.

Figure 7:
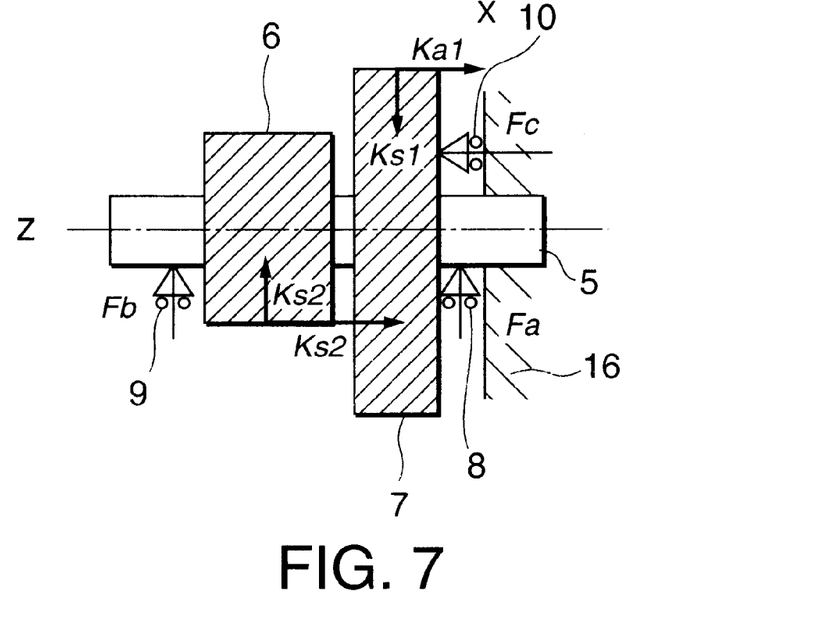
FIG. 7 is a schematic side view of the torque transmission device describing supporting forces acting on the device when a drive force is transmitted.
Figure 8:
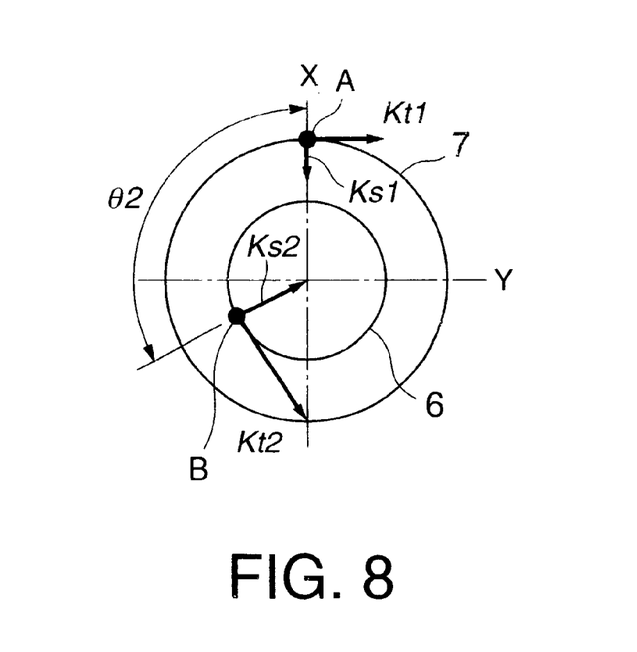
FIG. 8 is a schematic front view of the helical gears describing loads acting on the gears when they transmit the drive force.
Figure 9:
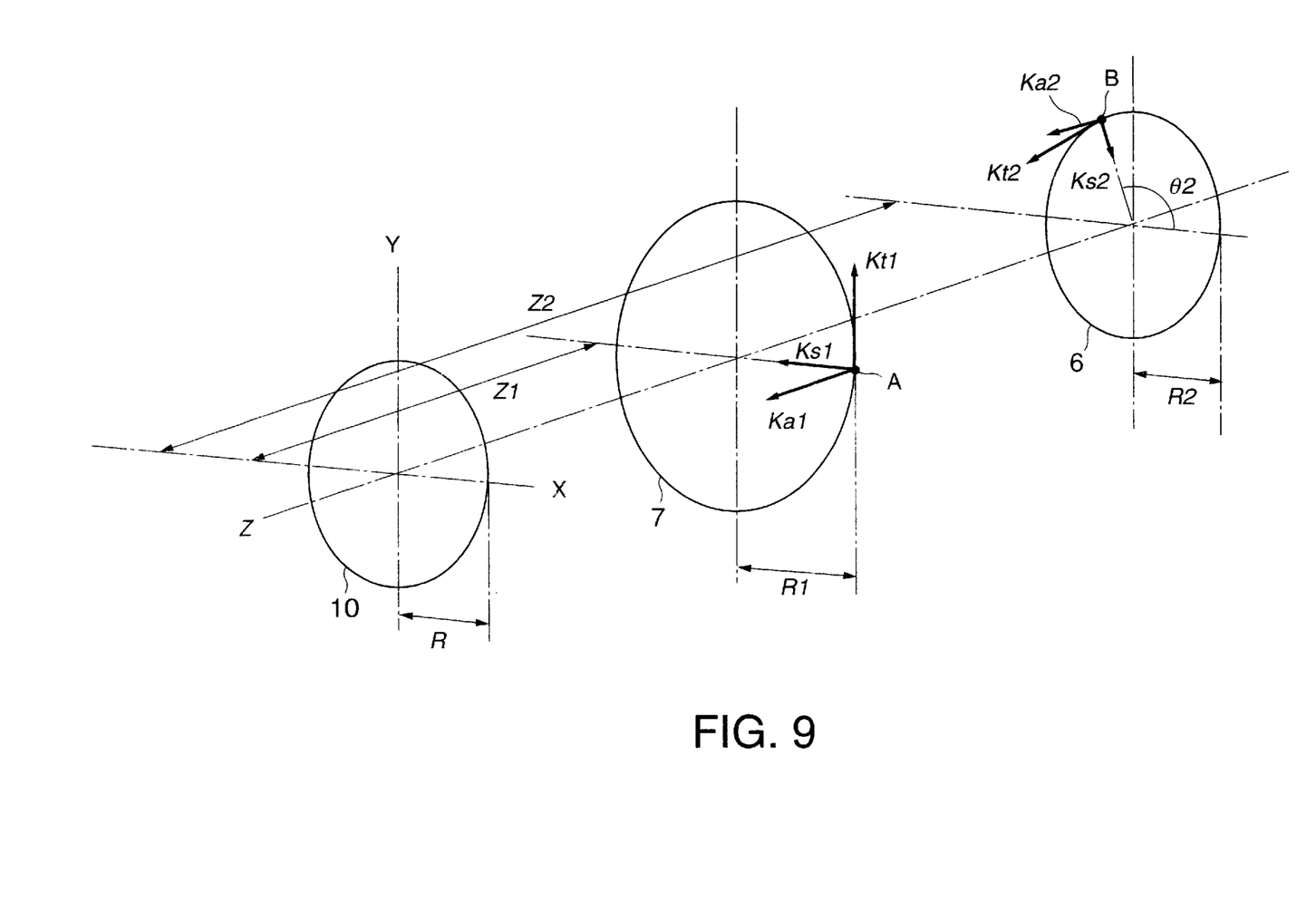
FIG. 9 is a three-dimensional diagram describing the location of the two helical gears and a thrust bearing according to this invention.

FIGS. 7–9 show dynamic models when the idler shaft 5 is supported on one side by the cover 16 via the thrust bearing 10.

The idler gear 7 meshes with the output gear 40 at a point A, and the reduction gear 6 meshes with the final gear 13 at a point B. At the point A, the axial load acting on the idler gear 7 is defined as Ka1, the central load acting on the idler gear 7 is defined as Ks1 and the tangential load acting on the idler gear 7 is defined as Kt1, respectively. At the point B, the axial load acting on the reduction gear 6 is defined as Ka2, the central load acting on the reduction gear 6 is defined as Ks2, and the tangential load acting on the reduction gear 6 is defined as Kt2, respectively.

A load acting on a radial bearing 9 is defined as Fb, a load acting on the radial bearing 10 is defined as Fa, and a load acting on the thrust bearing 10 is defined as Fc. Further, the center axis of the idler shaft 5 is taken as the Z axis, the axis passing through the mesh point A and the center of the idler shaft 5 is taken as the X axis, and the axis perpendicular to the X axis is taken as the Y axis.

The angle subtended by the mesh point A and the mesh point B at the center of the Z axis, is defined as the angle θ2.

The pitch circle radius of the idler gear 7 is defined as R1, the pitch circle radius of the reduction gear 6 is defined as R2, the average radius of the thrust bearing 10 is defined as R, the distance from the thrust bearing 10 to the idler gear 7 is defined as Z1, and the distance from the thrust bearing 10 to the reduction gear 6 is defined as Z2.

The pressure angle and the spiral angle of the teeth of the idler gear 7 are defined as α1 and β1 respectively. The pressure angle and the spiral angle of the teeth of the reduction gear 6 are defined as α2 and β2 respectively. The transmission torque of the idler shaft 5 is defined as T.

Using the above definitions, the loads acting on the idler shaft 7 are as follows.

$Kt1 = T/R1$ $Ks1 = Kt1 \times \tan \alpha 1 / \cos \beta 1$ $Ka1 = Kt1 \times \tan \beta 1$ The loads acting on the reduction gear 6 are as follows.

$Kt2 = T/R2$ $Ks2 = Kt2 \times \tan \alpha 2 / \cos \beta 2$ $Ka2 = Kt2 \times \tan \beta 2$ Solving the above equations, considering that the sum of the moments around the X axis, Y axis and Z axis is 0, and the sum of the forces along each axis is also 0, the magnitude and direction of the reaction exerted by the bearings 8, 9 and 10 on the gears 6 and 7 can be calculated.

Here, the condition that the idler shaft 5 does not tilt is that the application point of the reaction exerted by the thrust bearing 10 on the gears 6 and 7 must be inside the average radius R of the thrust bearing 10.

If the average radius R of the thrust bearing 10 satisfies the following conditional equation (1), tilt of the thrust shaft 5 is prevented.

$$R \geq \frac{R1 \cdot R2}{(R1 + R2 \cdot H)\sqrt{2 \cdot H\left\{\frac{(1+H^2)}{2} \cdot H + \cos\theta 2\right\}}} \quad \text{where,} \quad (1)$$

$$H = \frac{\tan \beta 1}{\tan \beta 2}.$$

Therefore, if the pitch circle radius R1 of the idler gear 7, the spiral angle β1, the pitch circle radius R2 of the reduction gear 6 and the spiral angle β2 are set based on the angle θ2 to satisfy equation (1), the average radius R of the thrust bearing 10 can be calculated so that the idler shaft 5 does not tilt.

For example, in FIGS. 7–9, the conditions are set as follows.

$R1 = 0.07361$ (m)

$\beta 1 = 29.3166$ (deg)

$R2 = 0.03215$ (m)

$\beta 2 = 27$ (deg)

$\theta 2 = 110$ (deg)

If these data are substituted in equation (1), $R \geq 0.0262$ (m) is obtained.

If the magnitude of R is set to satisfy this condition, tilt of the idler shaft 5 can be prevented. For example, if the outer diameter of the thrust bearing 10 (11) is set to 60 mm and the inner diameter is set to 40 mm, this condition will definitely be satisfied.

There is no need to subject the thrust bearings 10, 11 which comprise needle bearings to a prestress as was the case with the tapered roller bearing. Therefore, tilt of the idler shaft 5 can be prevented while suppressing frictional losses.

Next, referring to FIGS. 10A–10C and FIGS. 11A–11C, the angle θ2, and the forces and moments exerted by the reduction gear 6 and idler gear 7 on the idler shaft 5 will be described.

Figure 10A:
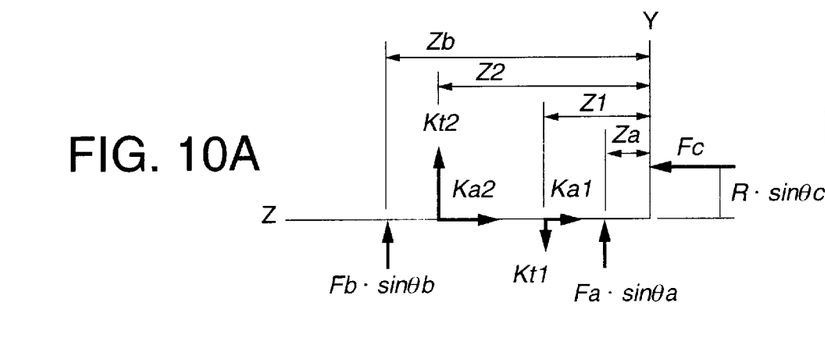
FIGS. 10A–10C are two-dimensional representations of the three-dimensional diagram of FIG. 9.
Figure 10B:
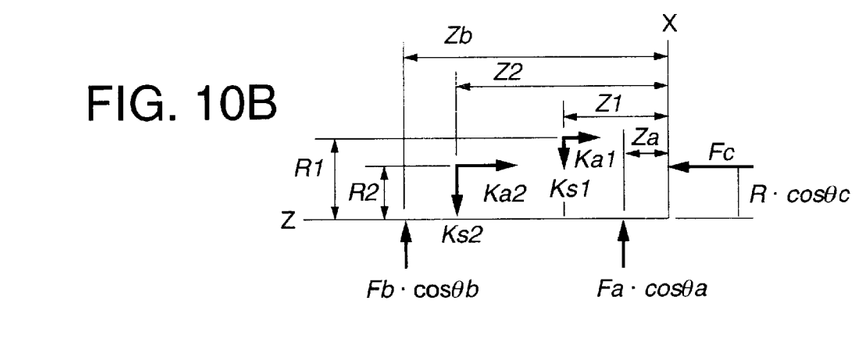
Figure 10C:
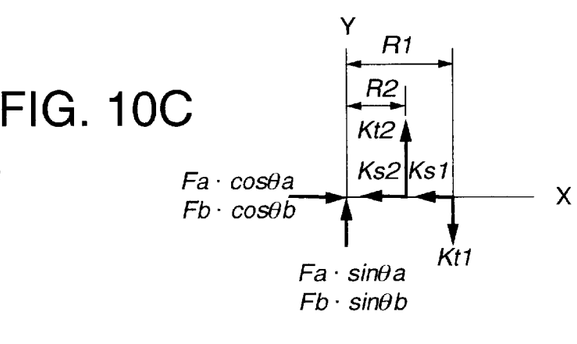

First, the three-dimensional forces shown in FIG. 9 will be split into two-dimensional forces to consider the forces acting on the idler shaft 5. FIG. 10A shows the forces acting in a plane specified by the Y axis and Z axis. FIG. 10B shows the forces acting on a plane specified by the X axis and Z axis. FIG. 10C shows the forces acting on a plane specified by the X axis and Y axis.

Here, the X axis is set parallel to the load in the central direction acting on the mesh point A of the idler gear 7, the Y axis is set parallel to the load in the tangential central direction acting on the mesh point A of the idler gear 7, and the Z axis is set parallel to the load in the axial direction acting on the mesh point A of the idler gear 7.

Therefore, the axial components of the tangential load Kt2 and central load Ks2 of the reduction gear 6 appearing on the planes in FIGS. 10A–10C vary according to the magnitude of the angle θ2.

Hence, the load on the idler shaft 5 is first calculated without including the load of the reduction gear 6. Next, the load acting on the idler shaft 5 due to the load of the reduction gear 6 is calculated. Finally, the total moment acting on the idler shaft 5 is calculated by summing these calculation results.

In this calculation, it is considered that the thrust load acting on the idler shaft 5 and the moment due to the thrust load are all supported by the thrust bearing 10.

In the calculation, let the sum of the moments around the X axis be ΣMx, the sum of the moments around the Y axis be ΣMy, and the sum of the moments around the Z axis be ΣMz. Further, let the sum of the forces in the X axis direction be ΣFx, the sum of the forces in the Y axis direction be ΣFy, and the sum of the forces in the Z axis direction be ΣFz.

Let the distance from the thrust bearing 10 to the radial bearing 8 be Za, and the distance from the thrust bearing 10 to the radial bearing 9 be Zb.

With the above assumptions, the moments and forces on the axes not including the load of the reduction gear 6 are shown by the following equations (2)–(7).

$\Sigma Mx = Kt1 \cdot Z1 + Fa \cdot \sin \theta a \cdot Za + Fb \cdot \sin \theta b \cdot Zb - Fc \cdot R \cdot \sin \theta c$ (2)

$\Sigma My = Ks1 \cdot Z1 - Ka1 \cdot R1 - Fa \cdot \cos \theta a \cdot Za - Fb \cdot \cos \theta b \cdot Zb + Fc \cdot R \cdot \cos \theta c$ (3)

$\Sigma Mz = Kt1 \cdot R1$ (4)

$\Sigma Fx = Fa \cdot \cos \theta a + Fb \cdot \cos \theta b - Ks1$ (5)

$\Sigma Fy = Fa \cdot \sin \theta a \cdot Za + Fb \cdot \sin \theta b - Kt1$ (6)

$\Sigma Fz = Fc - Ka1$ (7)

Figure 11A:
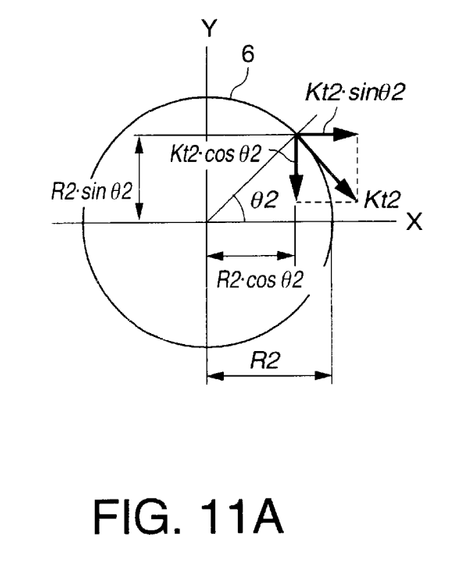
FIGS. 11A–11C are two-dimensional diagrams describing the load acting on one of the gears.
Figure 11B:
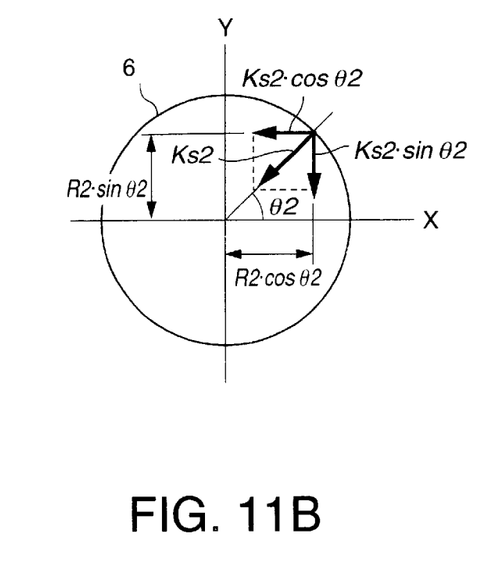
Figure 11C:
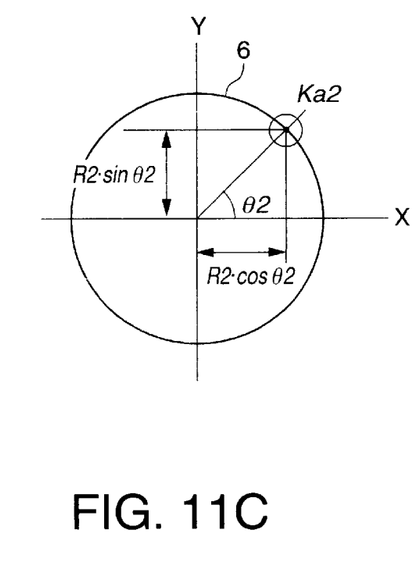

Next, the load on the idler shaft 5 due to the reduction gear 6 may be split into the tangential load Kt2, central load Ks2 and axial load Ka2 as shown in FIGS. 11A–11C.

First, referring to FIG. 11A, the components of the tangential load Kt2 in the X axis, Y axis and Z axis directions are as follows.

Component in X axis direction = $Kt2 \cdot \sin \theta 2$

Component in Y axis direction = $-Kt2 \cdot \cos \theta 2$

Component in Z axis direction = 0

The distances in the X axis, Y axis and Z axis directions from the center of the thrust bearing 10 to the mesh point B of the reduction gear 6 and final drive gear 13 are as follows.

Distance along $X$ axis$=R2\cdot\cos\theta2$

Distance along $Y$ axis$=R2\cdot\sin\theta2$

Distance along $Z$ axis$=Z2$

The moments Mx, My, Mz around the X axis, Y axis and Z axis exerted by the tangential load Kt2 on the idler shaft 5, are as follows.

$Mx=-Kt2\cdot Z2\cdot\cos\theta2$ $My=-Kt2\cdot Z2\cdot\sin\theta2$ $Mz=-Kt2\cdot R2$ Next, referring to FIG. 11B, the components of the central load Ks2 in the X axis, Y axis and Z axis directions are as follows.

Component in $X$ axis direction$=-Ks2\cdot\cos\theta2$

Component in $Y$ axis direction$=-Kt2\cdot\sin\theta2$

Component in $Z$ axis direction$=0$

The distances in the X axis, Y axis and Z axis directions from the center of the thrust bearing 10 to the mesh point B have already been calculated.

The moments Mx, My, Mz around the X axis, Y axis and Z axis exerted by the central load Kt2 on the idler shaft 5, are as follows.

$Mx=-Ks2\cdot Z2\cdot\sin\theta2$ $My=-Ks2\cdot Z2\cdot\cos\theta2$ $Mz=0$

Next, referring to FIG. 11C, the components of the axial load Ka2 in the X axis, Y axis and Z axis directions are as follows.

Component in $X$ axis direction$=0$

Component in $Y$ axis direction$=0$

Component in $Z$ axis direction$=-Ka2$

The distances in the X axis, Y axis and Z axis directions from the center of the thrust bearing 10 to the mesh point B have already been calculated.

The moments Mx, My, Mz around the X axis, Y axis and Z axis exerted by the axial load Ka2 on the idler shaft 5, are as follows.

$Mx=Ks2\cdot R2\cdot\sin\theta2$ $My=-Ka2\cdot R2\cdot\cos\theta2$ $Mz=0$

Therefore, the sum of the directional components of the forces and moments exerted by the reduction gear 6 on the idler shaft 5 are given by the following equations (8)–(13).

$\Sigma Mx=-Kt2\cdot Z2\cdot\cos\theta2-Ks2\cdot Z2\cdot\sin\theta2+Ka2\cdot R2\cdot\sin\theta2$ (8)

$\Sigma My=-Kt2\cdot Z2\cdot\sin\theta2+Ks2\cdot Z2\cdot\cos\theta2-Ka2\cdot R2\cdot R\cdot\cos\theta2$ (9)

$\Sigma Nz=-Kt2\cdot R2$ (10)

$\Sigma Fx=Kt2\cdot\sin\theta2-Ks2\cdot\cos\theta2$ (11)

$\Sigma Fy=-Kt2\cdot\cos\theta2-Ks2\cdot\sin\theta2$ (12)

$\Sigma Fz=-Ka2$ (13)

Adding equations (8)–(13) representing the moments and forces due to the load of the reduction gear 6 to equations (2)–(7) representing the calculation results not including the load due to the reduction gear 6, the following equations (14)–(19) are obtained.

$\Sigma Mx=-Kt1\cdot z1+Fa\cdot\sin\theta a\cdot Za+Fb\cdot\sin\theta b\cdot Zb-Fc\cdot R\cdot\sin\theta c-Kt2\cdot Z2\cdot\cos\theta2-Ks2\cdot Z2\cdot\sin\theta2+Ka2\cdot R2\cdot\sin\theta2=0$ (14)

$\Sigma My=Ks1\cdot Z1-Ka1\cdot R1-Fa\cdot\cos\theta a\cdot Za-Fb\cdot\cos\theta b\cdot Zb+Fc\cdot R\cdot\cos\theta c-Kt2\cdot Z2\cdot\sin\theta2+Ks2\cdot Z2\cdot\cos\theta2-Ka2\cdot R2\cdot\cos\theta2=0$ (15)

$\Sigma Mz=Kt1\cdot R1-Kt2\cdot R2=0$ (16)

$\Sigma Fx=Fa\cdot\cos\theta a+Fb\cdot\cos\theta b-Ks1+Kt2\cdot\sin\theta2-Ks2\cdot\cos\theta2=0$ (17)

$\Sigma Fy=Fa\cdot\sin\theta a+Fb\cdot\sin\theta b-Kt1-Kt2\cdot\cos\theta2-Ks2\cdot\sin\theta2=0$ (18)

$\Sigma Fz=Fc-Ka1-Ka2=0$ (19)

Considering that the thrust forces and moments exerted by the gears 6, 7 on the idler shaft 5 are supported by the thrust bearing 10, equation (2) can be rewritten as follows.

$Fc\cdot R\cdot\sin\theta c=Ka2\cdot R2\cdot\sin\theta2$

Similarly, equation (3) can be rewritten as follows.

$Fc\cdot R\cdot\cos\theta c=Ka1\cdot R1+Ka2\cdot R2\cdot\cos\theta2$

Equation (6) can be rewritten as follows.

$Fc=Ka1+Ka2$

Therefore, the following equation (20) is satisfied.

$$\sqrt{(Ka2\cdot R2\cdot\sin\theta2)^2+(Ka1\cdot R1+Ka2\cdot R2\cdot\cos\theta2)^2} \qquad (20)$$

The average radius R of the thrust bearing 10 is given by the following equation (21).

$$R=\frac{\sqrt{(Ka2\cdot R2\cdot\sin\theta2)^2+(Ka1\cdot R1+Ka2\cdot R2\cdot\cos\theta2)^2}}{Ka1+Ka2} \quad\text{where,} \qquad (21)$$

$$\sin\theta c=\frac{Ka2\cdot R2\cdot\sin\theta2}{Fc\cdot R},\quad\text{and}\quad\cos\theta c=\frac{Ka1\cdot R1+Ka2\cdot R2\cdot\cos\theta2}{Fc\cdot R}$$

Due to the above relations, equations (14) and (15) can be rewritten as the following equations (14A) and (15A).

$\Sigma Mx=-Kt1\cdot Z1+Fa\cdot\sin\theta a\cdot Za+Fb\cdot\sin\theta b\cdot Zb-Kt2\cdot Z2\cdot\cos\theta2-Ks2\cdot Z2\cdot\sin\theta2=0$ (14A)

$\Sigma My=Ks1\cdot Z1-Fa\cdot\cos\theta a\cdot Za-Fb\cdot\cos\theta b\cdot Zb-Kt2\cdot Z2\cdot\sin\theta2+Ks2\cdot Z2\cdot\cos\theta2=0$ (15A)

Equation (17) can be rewritten as the following equation (22).

$Fa\cdot\cos\theta a=(Ks1-Kt2\cdot\sin\theta2+Ks2\cdot\cos\theta2)-Fb\cdot\cos\theta b$ (22)

Here, if $(Ks1-Kt2\cdot\sin\theta2+Ks2\cdot\cos\theta2)$ in equation (22) is defined as A, equation (22) can be rewritten as equation (22A).

$Fa\cdot\cos\theta a=A-Fb\cdot\cos\theta b$ (22A)

Next, equation (18) can be rewritten as equation (23).

$$Fa \cdot \sin\theta a = (Ks1+Kt2\cdot\cos\theta 2+Ks2\cdot\sin\theta 2)-Fb\cdot\sin\theta b \quad (23)$$

Here, if $(Kt1+Kt2\cdot\cos\theta 2+Ks2\cdot\sin\theta 2)$ in equation (23) is defined as B, equation (23) can be rewritten as equation (23A).

$$Fa \cdot \sin\theta a = B - Fb \cdot \sin\theta b \quad (23A)$$

Further, dividing equation (23A) by equation (22A), the following equation (24) is obtained.

$$\tan\theta a = \frac{B - Fb\cdot\sin\theta b}{A - Fb\cdot\cos\theta b} \quad (24)$$

In equation (14A), if $(-Kt1\cdot Z1-Kt2\cdot Z2\cdot\cos\theta 2-Ks2\cdot Z2\cdot\sin\theta 2)$ is defined as C, equation (14A) can be rewritten as equation (14B).

$$\Sigma Mx = C + Fa\cdot\sin\theta a\cdot Za + Fb\cdot\sin\theta b\cdot Zb = 0 \quad (14B)$$

In equation (15), if $(Ks1\cdot Z1-Kt2\cdot Z2\cdot\sin\theta 2+Ks2\cdot Z2\cdot\cos\theta 2)$ is defined as D, equation (15A) can be rewritten as equation (15B).

$$\Sigma My = D - Fa\cdot\cos\theta a\cdot Za - Fb\cdot\cos\theta b\cdot Zb = 0 \quad (15B)$$

Substituting equation (22A) into equation (15B), the following equation (15C) is obtained.

$$\Sigma My = D - (A - Fb\cdot\cos\theta b)\cdot Za - Fb\cdot\cos\theta b\cdot Zb = 0 \quad (15C)$$

Therefore, the following equation (25) is satisfied.

$$Fb\cdot\cos\theta b = (D - A\cdot Za - Fb\cdot\cos\theta b\cdot Zb) \quad (25)$$

Similarly, substituting equation (23A) into equation (14B), the following equation (14C) is obtained.

$$\Sigma Mx = C + (B - Fb\cdot\sin\theta b)\cdot Za + Fb\cdot\sin\theta b\cdot Zb = 0 \quad (14C)$$

Therefore, the following equation (26) is satisfied.

$$Fb\cdot\sin\theta b = \frac{-(C + B\cdot Za)}{Zb - Za} \quad (26)$$

From equations (25) and (26), the load Fb supported by the radial bearing 9 is given by the following equation (27).

$$Fb = \frac{\sqrt{(D - A\cdot Za)^2 + (-C + B\cdot Za)^2}}{Zb - Za} \quad (27)$$

Further, from equations (22A) and (23A), the load Fa supported by the radial bearing 10 is given by the following equation (28).

$$Fa = \sqrt{(A - Fb\cdot\cos\theta b)^2 + (B - Fb\cdot\sin\theta b)^2} \quad (28)$$

Solving the relational expressions that the sum $\Sigma M$ of moments around the axes and the sum $\Sigma F$ of forces in the axial directions are respectively zero, the reactions of the bearings and their directions of action can be calculated.

Figure 12:
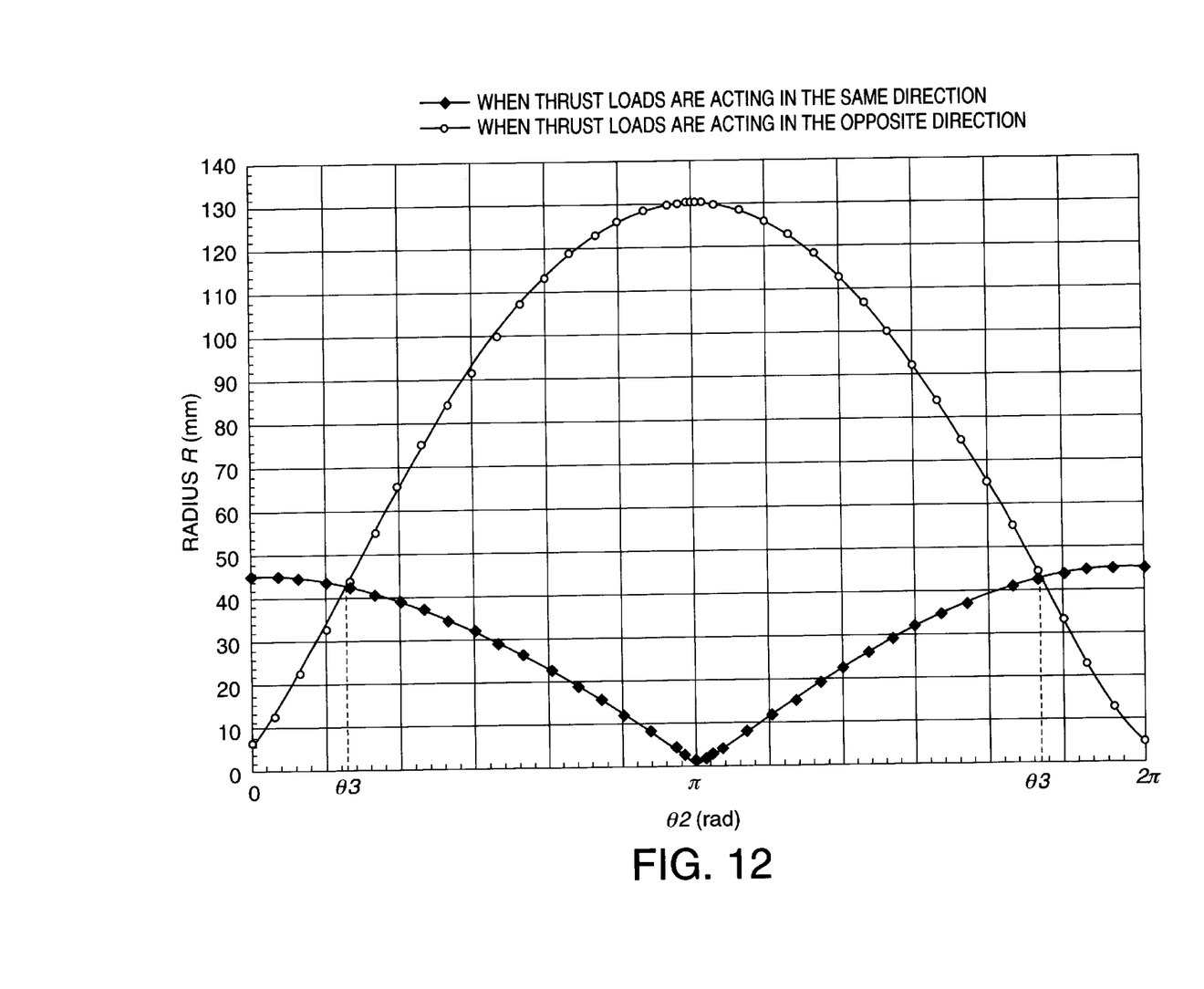
FIG. 12 is a diagram describing a relation between an average radius R of the thrust bearing and an angle θ2 subtended by two mesh points of the gears.

Next, equation (20) specifies the relations shown in FIG. 12 concerning the average radius R of the thrust bearings 10, 11, and the angle $\theta 2$ subtended by the mesh points A and B.

Figure 3:
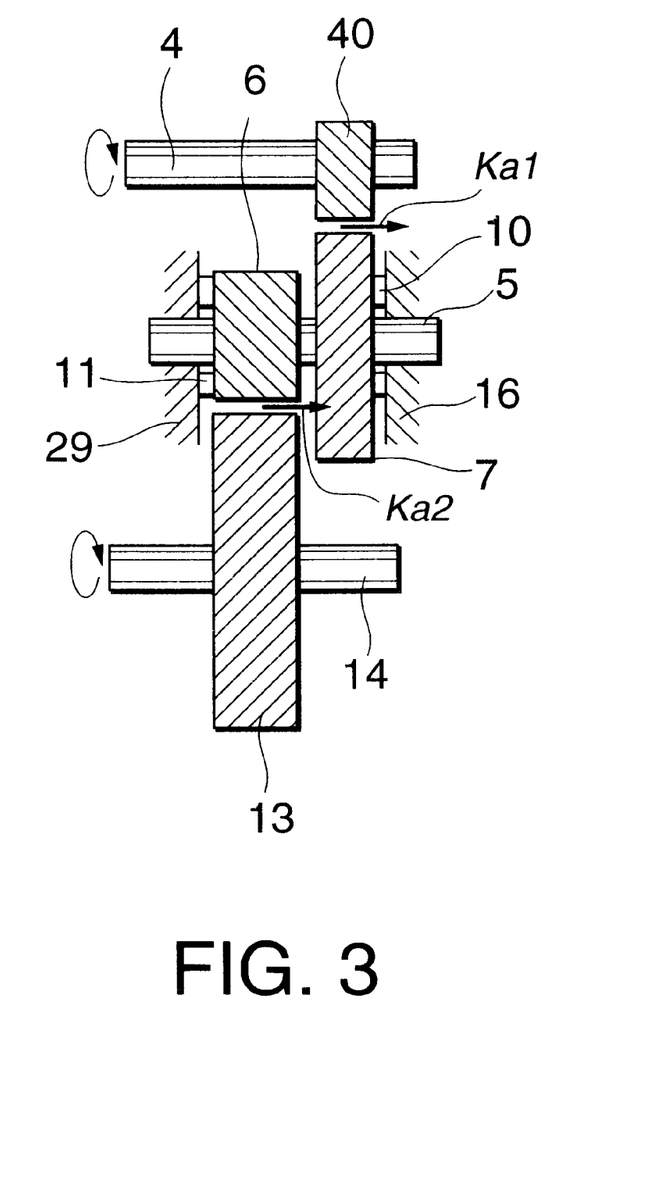
FIG. 3 is a schematic diagram of the torque transmission device.

Specifically, when the thrust load acting on the idler gear 7 and the thrust load acting on the reduction gear 6 are in the same direction as shown in FIG. 3, the average radius R of the thrust bearing 10 (11) is a maximum at $\theta 2=0$, and a minimum at $\theta 2=\pi$ (rad).

Here, the average radius R when the thrust loads on the idler gear 7 and reduction gear 6 are in the same direction, and the average radius R when they are in opposite directions, are equal when the angle $\theta 2$ is equal to the angle $\theta 3$. This angle $\theta 3$ is given by the following equation (29).

$$\theta 3 = \cos^{-1}\left\{H^2 \cdot \left(\frac{R2}{R1}\right) \cdot \frac{1}{2}\right\} \quad (29)$$

Hence, when the angle $\theta 2$ of the mesh points A and B is larger than the angle $\theta 3$ in the range from zero to $\pi$ (rad), by setting the spiral angle $\beta 2$ of the reduction gear 6 and the spiral angle $\beta 1$ of the idler gear 7 so that the thrust forces act in the same direction, the average radius R of the thrust bearings 10, 11 can be made small.

Conversely, when the angle $\theta 2$ at the mesh points A and B is less than the angle $\theta 3$ within a range from zero to $\pi$ (rad), by setting the spiral angle $\beta 2$ of the reduction gear 6 and the spiral angle $\beta 1$ of the idler gear 7 so that the thrust forces act in opposite directions, the average radius R of the thrust bearings 10, 11 can be made small.

The contents of Tokugan 2000-233017, with a filing date of Aug. 1, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, ball bearings or roller bearings may be used for the radial bearings 8 and 9.

The embodiments of this invention in which an exclusive property or privilege is claimed are defined as follows:

What is claimed is:

1. A torque transmission device, comprising:

a first rotating shaft supporting a first helical gear;

a second rotating shaft supporting a second helical gear, the second rotating shaft being disposed parallel to the first rotating shaft;

a rotation body comprising a third helical gear which meshes with the first helical gear, and a fourth helical gear which meshes with the second helical gear;

an intermediate shaft which supports the rotation body, the intermediate shaft being disposed parallel to the first rotating shaft; and a thrust bearing which supports the rotation body in a direction along the intermediate shaft, the thrust bearing having an average radius R specified by the following equation:

$$R \geq \frac{R1 \cdot R2}{(R1 + R2 \cdot H)\sqrt{2 \cdot H\left\{\frac{(1+H^2)}{2} \cdot H + \cos\theta 2\right\}}} \text{ where,}$$

$$H = \frac{\tan\beta 1}{\tan\beta 2},$$

R1=pitch circle radius of the third helical gear,
R2=pitch circle radius of the fourth helical gear,
$\beta 1$=spiral angle of the third helical gear, β2=spiral angle of the fourth helical gear, and θ2=angle subtended by the mesh point of the first helical gear and third helical gear, and the mesh point of the second helical gear and fourth helical gear, with the intermediate shaft as center.

2. The torque transmission device as defined in claim 1, wherein β1 and β2 are set at a value which gives a negative value to H, and the angle θ2 is set to be less than a predetermined value θ3 given by the following equation: where, R2=pitch circle radius of the third helical gear, and R2=pitch circle radius of the fourth helical gear.

3. The torque transmission device as defined in claim 1, wherein β1 and β2 are set a value which gives a positive value to H, and the angle θ2 is set to be larger than a predetermined value θ3 given by the following equation: where, R1=pitch circle radius of the third helical gear, and R2=pitch circle radius of the fourth helical gear.

4. The torque transmission device as defined in claim 1, wherein the thrust bearing comprises a needle bearing.

5. The torque transmission device as defined in claim 1, wherein the device further comprises a radial bearing which supports the rotation body on the intermediate shaft.

6. The torque transmission device as defined in claim 5, wherein the radial bearing comprises a needle bearing.

7. The torque transmission device as defined in claim 1, wherein the third helical gear and the fourth helical gear are arranged to rotate together.

8. The torque transmission device as defined in claim 1, wherein the second helical gear is a final drive gear of a differential mounted on a vehicle.

9. The torque transmission device as defined in claim 1, wherein the fourth helical gear comprises a sleeve-shaped extension part of which an outer circumference is spline-jointed to an inner circumference of the fourth gear.

10. The torque transmission device as defined in claim 1, wherein the pitch circle radius R1 of the third helical gear is set to be larger than a pitch circle radius R2 of the fourth helical gear.

* * * * *